(12) United States Patent
Yonemori

(10) Patent No.: US 12,732,077 B2
(45) Date of Patent: Sep. 8, 2026

(54) VEHICLE DRIVE SYSTEM

(71) Applicant: Mazda Motor Corporation, Hiroshima (JP)

(72) Inventor: Kei Yonemori, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 200 days.

(21) Appl. No.: 18/660,373

(22) Filed: May 10, 2024

(65) Prior Publication Data

US 2024/0388186 A1 Nov. 21, 2024

(30) Foreign Application Priority Data

May 15, 2023 (JP) ................................ 2023-080424

(51) Int. Cl.
*H02K 21/46* (2006.01)
*B60L 15/20* (2006.01)

(52) U.S. Cl.
CPC .......... *H02K 21/46* (2013.01); *B60L 15/2045* (2013.01)

(58) Field of Classification Search
CPC ...... B60L 50/51; B60L 15/20; B60L 15/2045; H02K 21/46; H02K 1/276; H02K 1/223; H02K 11/30; H02K 2213/09; H02K 7/006
See application file for complete search history.

(56) References Cited

U.S. PATENT DOCUMENTS 8,288,908 B2 * 10/2012 Finkle .................. H02K 21/028 310/156.43
2018/0083565 A1 * 3/2018 Saha ......................... H02P 6/14
2018/0294761 A1 * 10/2018 Yamamoto ................ H02P 6/08
2019/0283800 A1 * 9/2019 Taki ........................ H02P 5/685

FOREIGN PATENT DOCUMENTS

JP 2000-178840 A 6/2000
JP 4655786 B2 3/2011
WO 2017090159 A1 6/2017

OTHER PUBLICATIONS

European Search Report mailed Oct. 15, 2024, in European Application No. 24174727.8, 7 pages.

* cited by examiner

*Primary Examiner* — Leda T Pham
(74) *Attorney, Agent, or Firm* — XSENSUS LLP

(57) ABSTRACT

The vehicle drive system includes a motor that has a stator and a rotor provided in the stator and that drives a drive wheel of a vehicle by rotation of the rotor. The rotor has: plural secondary conductors that are aligned in a circumferential direction in a radially outer portion; and plural permanent magnets that are aligned in the circumferential direction in a portion on a radially inner side of these plural secondary conductors. An ECU and a motor ECU capable of switching a drive mode of the motor between a synchronous operation mode and an asynchronous operation mode are further provided. Based on required output for the motor, the ECU and the motor ECU are configured to switch the drive mode of the motor from the synchronous operation mode to the asynchronous operation mode.

6 Claims, 10 Drawing Sheets

VEHICLE DRIVE SYSTEM

CROSS-REFERENCE TO RELATED APPLICATION

The present application claims priority to Japanese Patent Application 2023-080424, filed May 15, 2023, the entire contents of which are incorporated herein by reference.

BACKGROUND

Field

The present disclosure relates to a vehicle drive system and, in particular, to a vehicle drive system that is applied to a vehicle traveling by using a motor as a drive source.

Description of the Related Art

Conventionally, an electric vehicle that does not have an internal combustion engine (an engine) and travels by using an electric motor (a motor) as a drive source has been known.

The motors are largely classified into a PM motor (a synchronous motor) that uses a magnetic force of a permanent magnet to rotate a rotor and an IM motor (an asynchronous motor) that uses an induced current generated in a conductor to rotate the rotor. The PM motor is frequently selected for the electric vehicle since the PM motor can be actuated at maximum torque instantaneously even in a low-speed range.

An advantage of the PM motor is that the PM motor can be actuated at the maximum torque even in the low-speed range as described above. However, in a high-speed range, since a large back electromotive force is generated due to an effect of the permanent magnet, there is a disadvantage of reduced output.

In order to eliminate the above disadvantage, for example, the following motor is disclosed in Patent document 1. The motor includes a stator and a cage-shaped rotor, and a permanent magnet is embedded in the cage-shaped rotor.

PRIOR ART DOCUMENTS

Patent Documents

[Patent document 1] JP2000-178840A

SUMMARY

By the way, since required drive power for the vehicle is changed rapidly due to a driving operation by a driver or travel environment, the motor that is used as the vehicle drive source is desired to have a characteristic capable of generating such required output.

Accordingly, it is considered to apply, as the vehicle drive source, a motor that has characteristics of both the PM motor and the IM motor as in Patent document 1. Then, while the motor performs synchronous operation in the low-speed range, the motor performs asynchronous operation in the high-speed range, so as to suppress an effect of the back electromotive force.

However, the motor disclosed in Patent document 1 performs the asynchronous operation only until a rotation speed of the cage-shaped rotor reaches a synchronous speed or in case of emergency stop, and thus the synchronous operation is presupposed. For this reason, it is difficult for the motor disclosed in Patent document 1 to generate a wide range of the required output according to the driver's preference and the like.

The disclosure has been made in view of such a point and therefore has a purpose of providing a vehicle drive system capable of changing a characteristic of a motor according to a wide range of required output in a vehicle that uses the motor as a traveling drive source.

Means for Solving the Problem

In order to achieve the above purpose, in a vehicle drive system according to the disclosure, a drive mode of a motor is switched from a synchronous operation mode to an asynchronous operation mode according to required output during travel of a vehicle.

More specifically, the disclosure provides the vehicle drive system including the motor that has a cylindrical stator and a cylindrical rotor rotatably provided in the stator to be coaxial with a center axis of the stator and that drives a drive wheel of the vehicle by rotation of the rotor.

The rotor has: plural secondary conductors that extend in an axial direction and aligned in a circumferential direction in a radially outer portion; and plural permanent magnets that extend in the axial direction and aligned in the circumferential direction in a portion on a radially inner side of these plural secondary conductors. This vehicle drive system further includes: a control section capable of switching a drive mode of the motor between a synchronous operation mode in which the rotor is rotated by using a magnetic force of the permanent magnet; and an asynchronous operation mode in which the rotor is rotated by using an induced current generated in the secondary conductor. The control section is configured to switch the drive mode of the motor from the synchronous operation mode to the asynchronous operation mode on the basis of required output for the motor.

With this configuration, since the control section switches the drive mode of the motor from the synchronous operation mode, in which the rotor is rotated by using the magnetic force of the permanent magnet, to the asynchronous operation mode, in which the rotor is rotated by using the induced current generated in the secondary conductor, according to the required output for the motor. Thus, the characteristic of the motor can be changed during travel of the vehicle by such mode switching. In this way, it is possible to generate a wide range of the required output according to a driver's preference.

By the way, the motor includes both of the secondary conductor, in which the induced current is generated, and the permanent magnet. When the motor functions as an asynchronous motor, torque pulsation occurs due to a magnetic force of the inevitably existing permanent magnet. Thus, it is assumed that such torque pulsation is transmitted to a cabin and gives a sense of discomfort to the driver.

Accordingly, in the vehicle drive system, in the asynchronous operation mode, the control section may be configured to superimpose a current, which generates torque in an opposite phase from a phase of the torque pulsation by the permanent magnet, on a drive current generated by the motor and supply such a current to a stator coil of the stator.

With this configuration, since the control section superimposes the current, which generates the torque in the opposite phase from the phase of the torque pulsation by the permanent magnet, on the drive current of the motor, the torque pulsation by the permanent magnet in the asynchronous operation mode can be canceled out. Therefore, it is possible to suppress unpleasant vibration of the motor from being transmitted to the cabin.

By the way, in an engine vehicle, engine vibration that is transmitted to the cabin is changed according to a difference in an engine operation state. Thus, many drivers recognize the engine operation state from such vibration transmitted to the cabin. On the contrary, in the vehicle that is driven by the motor generating less vibration than the engine, it is difficult for the driver to recognize the vibration of the motor. Thus, such a case is assumed that, when the driver who is accustomed to driving the engine vehicle drives the motor-driven vehicle, the driver cannot recognize the operation state from the vibration transmitted to the cabin and thus feels the sense of discomfort.

In order to handle the above case, in the vehicle drive system, the control section may be configured to allow the torque pulsation in a travel state that requires relatively high drive torque in the asynchronous operation mode.

With this configuration, in the travel state that requires the relatively high drive torque, such as the time when acceleration is requested, the torque pulsation is allowed. Thus, the vibration of the motor, which is transmitted to the cabin, allows the driver to recognize that the vehicle is accelerated as desired by the driver himself/herself, for example.

Advantages

As it has been described so far, the vehicle drive system according to the disclosure can change the characteristic of the motor according to a wide range of required output in the vehicle that uses the motor as a traveling drive source.

BRIEF DESCRIPTION OF THE DRAWINGS

The scope of the present disclosure is best understood from the following detailed description of exemplary embodiments when read in conjunction with the accompanying drawings.

DETAILED DESCRIPTION

A description will hereinafter be made on a mode for carrying out the disclosure with reference to the drawings.

(Overall Configuration of Electric Vehicle)

Figure 1:
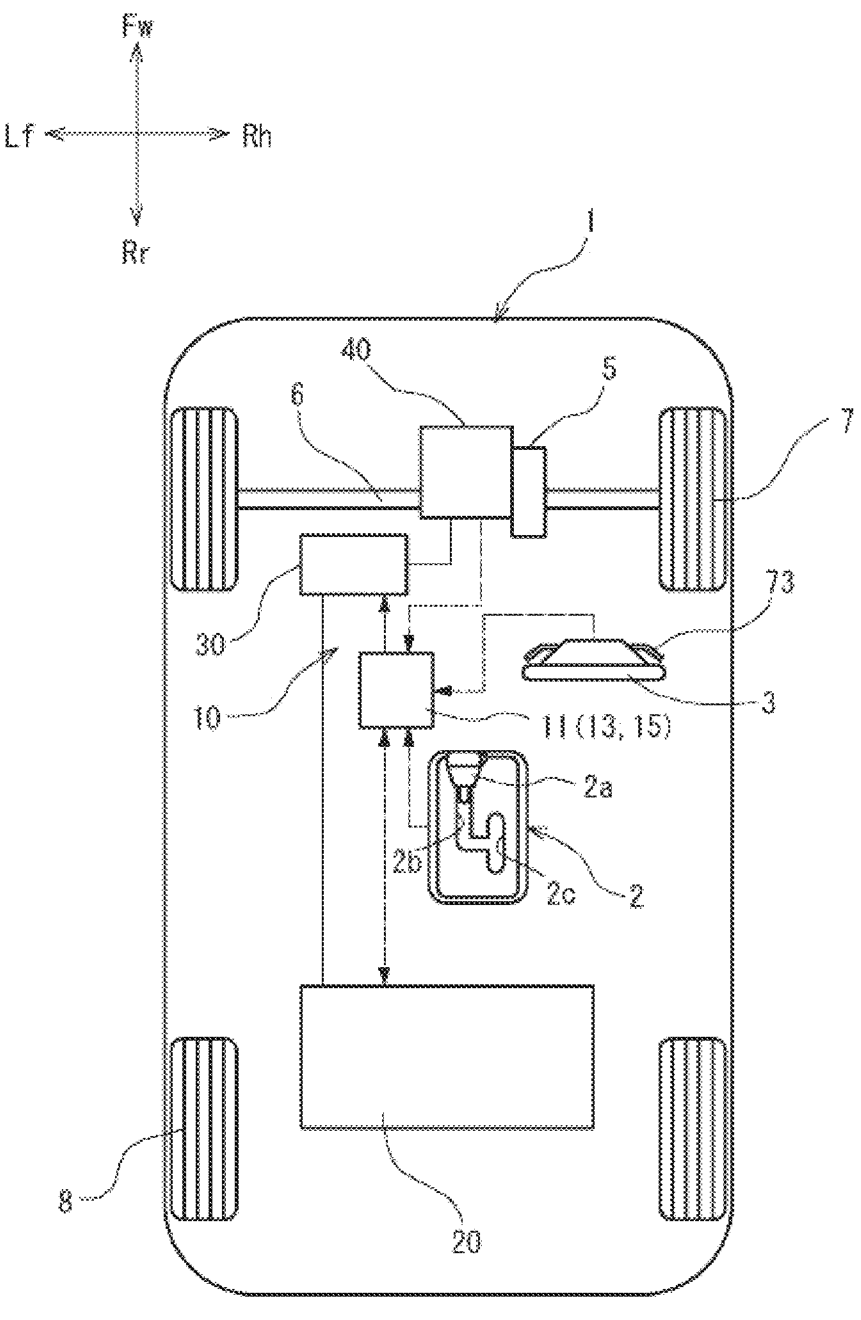
FIG. 1 is a plan view schematically illustrating a vehicle on which a vehicle drive system according to an embodiment of the disclosure is mounted.

FIG. 1 is a plan view schematically illustrating a vehicle 1 on which a vehicle drive system 10 according to this embodiment is mounted. FIG. 1 indicates a front side Fw in a vehicle front-rear direction, a rear side Rr in the vehicle front-rear direction, a right side Rh in a vehicle width direction, and a left side Lf in the vehicle width direction. As illustrated in FIG. 1, the vehicle 1 includes a battery 20, an inverter 30, a motor 40, and various electronic control units (ECUs) 11, 13, 15 for controlling these components. These battery 20, inverter 30, motor 40, and various ECUs 11, 13, 15 constitute essential parts of the vehicle drive system 10.

In this vehicle 1, the inverter 30 converts a direct current supplied from the battery 20 to an alternating current and supplies the alternating current to the motor 40, and the motor 40 is thereby rotationally driven. Torque generated by the motor 40, which is rotationally driven just as described, is reduced by a reduction drive 5 and then output to a driveshaft 6. Consequently, a right and left pair of drive wheels (front wheels 7) is rotationally driven to cause rotation of driven wheels (rear wheels 8). In this way, the vehicle 1 travels. That is, the vehicle 1 is configured as an electric vehicle that travels by using the motor 40 as a drive source. Thus, hereinafter, the vehicle 1 will also be referred to as an "electric vehicle 1".

As illustrated in FIG. 1, the electric vehicle 1 also includes a shifter 2 and a paddle switch 73 that is provided on a steering wheel 3. A signal corresponding to an operation of each of these shifter 2 and paddle switch 73 is input to the ECU 11. This electric vehicle 1 is not equipped with a transmission, which is normally mounted on an engine vehicle. However, when a driver operates any of these shifter 2 and paddle switch 73, a characteristic of the motor 40 is changed to enable "driving" that reflects the driver's preference.

(Vehicle Drive System)

Figure 2:
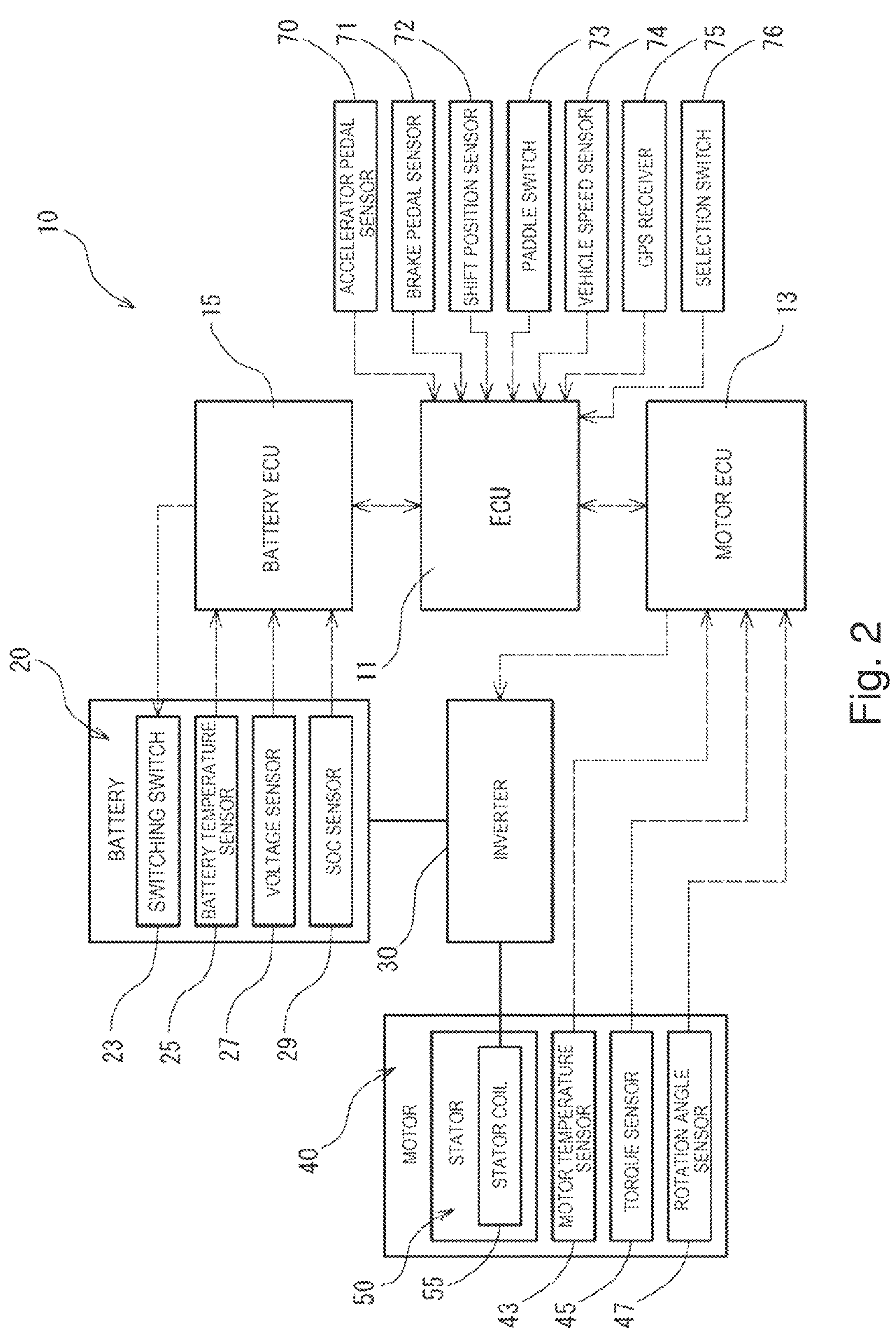
FIG. 2 is a block diagram schematically illustrating the vehicle drive system.

FIG. 2 is a diagram schematically illustrating the vehicle drive system 10. As illustrated in FIG. 2, this vehicle drive system 10 includes the ECU 11, the motor ECU 13, the battery ECU 15, the battery 20, the inverter 30, the motor 40, various sensors (including switches) 70, 71, 72, 73, 74, 76, and a Global Positioning System (GPS) receiver 75. The various sensors 70, 71, 72, 73, 74, 76 detect an accelerator pedal depression amount, a brake pedal depression amount, a vehicle speed V of the electric vehicle 1, and the like.

—ECU—

The ECU 11 is configured to include a so-called microcomputer having, for example, a central processing unit (CPU), read only memory (ROM) that stores a program executed by the CPU, a map, and the like in advance, random access memory (RAM) in which the CPU temporarily stores data when necessary, backup RAM that holds the data even when power is cut off, an input/output interface, and the like. The CPU executes various types of control by executing signal processing according to the program, which is stored in the ROM in advance, while using a temporary storage function of the RAM.

In addition, the ECU 11 is connected to the motor ECU 13 and the battery ECU 15 via a controller area network (CAN) communication line, can exchange information with each other as indicated by broken arrows in FIG. 2, and plays a role in integrating the motor ECU 13 and the battery ECU 15.

Furthermore, as illustrated in FIG. 2, the ECU 11 is electrically connected to the accelerator pedal sensor 70, the brake pedal sensor 71, the shift position sensor 72, the paddle switch 73, the vehicle speed sensor 74, the GPS receiver 75, and the selection switch 76, and detection results and various of information are types input/transmitted to the ECU 11 from these.

The accelerator pedal sensor 70 is attached to an accelerator pedal, detects the accelerator pedal depression amount, and outputs a signal representing the detected accelerator pedal depression amount to the ECU 11. The accelerator pedal sensor 70 may be configured to detect an accelerator pedal depression change amount (a change amount per unit time).

The brake pedal sensor 71 is attached to a brake pedal, detects the brake pedal depression amount, and outputs a signal representing the detected brake pedal depression amount to the ECU 11. The brake pedal sensor 71 may be configured to detect a brake pedal depression change amount (a change amount per unit time).

The shift position sensor 72 is provided to each shift position in the shifter 2, detects which of a parking (P) range, a reverse (R) range, a drive (D) range, and a manual (M) range a shift lever 2*a* is located, and outputs a detection result to the ECU 11. The P range, the R range, and the D range are arranged in a main gate 2*b* while the M range is arranged in a sub gate 2*c*. Furthermore, the sub gate 2*c* is a returnable gate with the M range being a reference position. The shift position sensor 72 is configured to output, to the ECU 11, a signal in any of five levels D−−, D−, D, D+, D++ in response to the number of operations to move the shift lever 2*a* to the front in the vehicle front-rear direction (positive operations) or the number of operations to move the shift lever 2*a* to the rear in the vehicle front-rear direction (negative operations) performed by the driver.

The paddle switch 73 is a returnable switch that is provided as a right and left pair on a back side (the front side in the vehicle front-rear direction) of the steering wheel 3 and that can repeatedly be pulled toward the driver (the rear side in the vehicle front-rear direction) by the driver. The right and left pair of the paddle switches 73 is configured to output, to the ECU 11, a signal in any of five levels D−−, D−, D, D+, D++ in response to the number of operations to pull the paddle switch 73 on the right side in the vehicle width direction toward the driver (positive operations) or the number of operations to pull the paddle switch 73 on the left side in the vehicle width direction toward the driver (negative operations).

The ROM of the ECU 11 stores required torque for the motor 40 that is set to be increased in an order of D−−, D−, D, D+, D++. Then, the ECU 11 controls the motor 40 in a manner to reflect the driver's intention that is expressed by the operation of the shift lever 2*a* or the paddle switch 73.

The vehicle speed sensor 74 is configured to detect the vehicle speed V of the electric vehicle 1 on the basis of wheel rotational speeds of the drive wheels (the front wheels 7) and the like and output a signal representing the detected vehicle speed V to the ECU 11. The ECU 11 is configured to control the motor 40 on the basis of the vehicle speed V detected by the vehicle speed sensor 74, and the like.

The GPS receiver 75 measures a location of the electric vehicle 1 (for example, latitude and longitude of the electric vehicle 1) by receiving radio waves from plural GPS satellites, and transmits location information thereof to the ECU 11. The ECU 11 is configured to acquire (recognize) surrounding travel environment of the electric vehicle 1 on the basis of the location information received from the GPS receiver 75, a map database stored in the ROM, for example, and the like. More specifically, the ECU 11 acquires information such as on whether the electric vehicle 1 is presently traveling on a flat road, traveling on an uphill road, traveling on a downhill road, turning, traveling on a winding road, or traveling in an urban area. Here, when the information such as on whether the electric vehicle 1 is presently traveling on the uphill road or the downhill road is to be acquired, the method for acquiring the surrounding travel environment is not limited thereto, and a gradient sensor that detects a road surface gradient may be used. The selection switch 76 will be described below.

—Battery—

The battery 20 is configured as a battery pack in which plural electrically-connected battery modules 21 (see FIGS. 3A-3B) are stacked and accommodated in a battery case. Each of the battery modules 21 includes, as a main portion, plural battery cells, each of which is a lithium-ion secondary battery, a nickel-metal hydride secondary battery, or the like. In detail, each of the battery modules 21 is a module that is formed by electrically connecting the plural battery cells. The battery cells and insulators are alternately stacked in a manner to hold the insulator between two each of the battery cells.

As illustrated in FIG. 2, a battery temperature sensor 25, a voltage sensor 27, a state of charge (SOC) sensor 29, and the like are attached to the battery 20. The battery temperature sensor 25 detects a temperature of the battery 20. The voltage sensor 27 detects a voltage of the battery 20. The SOC sensor 29 detects an SOC of the battery 20. These battery temperature sensor 25, voltage sensor 27, and SOC sensor 29 are electrically connected to the battery ECU 15 and configured to output a signal representing the detected temperature, a signal representing the detected voltage, and a signal representing the SOC to the battery ECU 15, respectively.

—Battery ECU—

Similar to the ECU 11, the battery ECU 15 is configured to include a so-called microcomputer having, for example, a CPU, ROM, RAM, backup RAM, an input/output interface, and the like. The CPU executes various types of control by executing signal processing according to a program, which is stored in the ROM in advance, while using a temporary storage function of the RAM.

As described above, the battery ECU 15 is connected to the ECU 11 via the CAN communication line, and is configured to output, to the ECU 11, the signal related to the temperature of the battery 20 received from the battery temperature sensor 25, the signal related to the voltage of the battery 20 received from the voltage sensor 27, and the signal related to the SOC of the battery 20 received from the SOC sensor 29. In addition, when the temperature of the battery 20 is excessively low, regenerative charging capability is impaired. Meanwhile, when the temperature of the battery 20 is excessively high, failure possibly occurs. Thus, the battery ECU 15 is configured to adjust a flow rate of a battery coolant, and the like on the basis of the temperature of the battery 20.

Figure 3A:
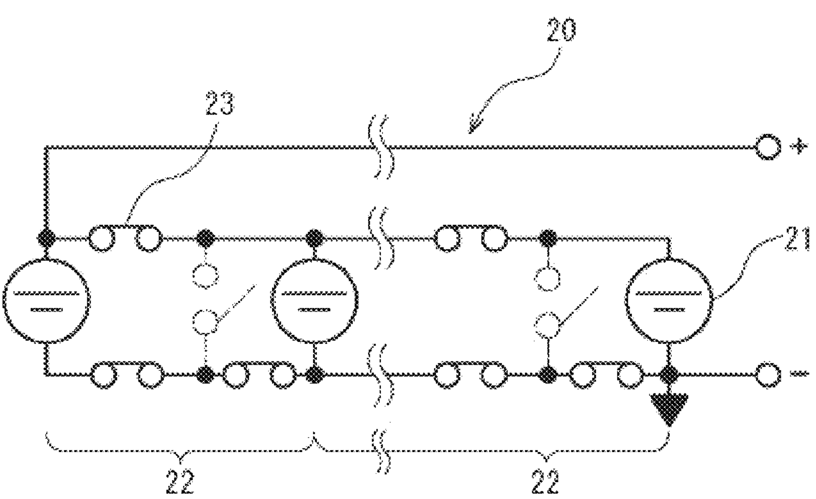
FIGS. 3A and 3B include views, each of which schematically illustrate a configuration of a battery.
Figure 3B:
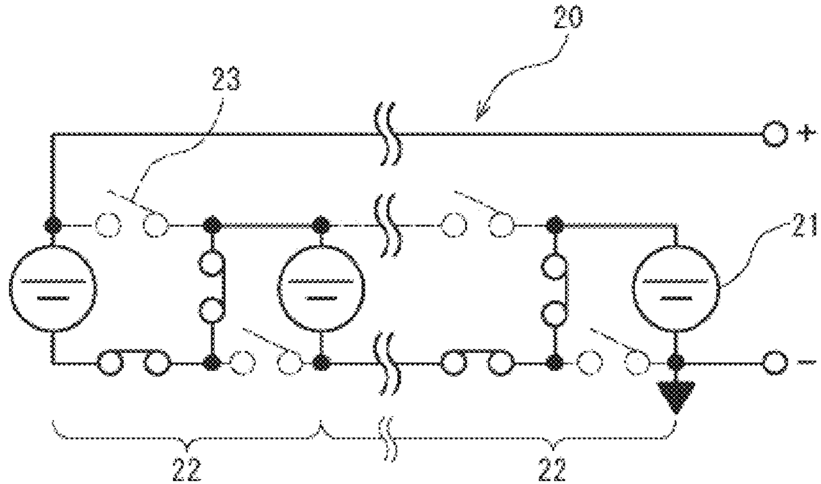

FIGS. 3A and 3B include views, each of which schematically illustrate the configuration of the battery 20. In FIGS. 3A and 3B, in order to make the drawing easily viewable, the battery modules 21 and switching switches 23 are deformed. As illustrated in FIGS. 3A and 3B, the plural battery modules 21 are configured to include plural ([number of the battery modules 21-1]) battery module pairs 22 that are electrically connected to each other via the switching switches 23. Each of the switching switches 23 is configured to be switched between ON/OFF on the basis of a command from the battery ECU 15.

With such a configuration, when the switching switch 23 is switched by the command from the battery ECU 15 as illustrated in FIG. 3A, all of the plural battery modules 21 (the battery module pairs 22) can be connected in parallel in the battery 20. Just as described, when all of the plural battery modules 21 are connected in parallel in the battery 20, a supply voltage is relatively reduced, but a supply current can relatively be increased.

Meanwhile, when the switching switch 23 is switched by the command from the battery ECU 15 as illustrated in FIG. 3B, all of the plural battery modules 21 (the battery module pairs 22) can be connected in series in the battery 20. Just as described, when all of the plural battery modules 21 are connected in series in the battery 20, the supply current is relatively reduced, but the supply voltage can relatively be increased.

When the switching switch 23 is switched by the command from the battery ECU 15, a connection mode of some of the battery module pairs 22 can be set in series, and the connection mode of the rest of the battery module pairs 22 can be set in parallel.

The battery ECU 15 and the battery 20 can change the connection mode of the battery module pairs 22 between in series and in parallel not only when the electric vehicle 1 is stopped or parked but also when the electric vehicle 1 is traveling.

—Motor—

<Overall Configuration>

Figure 4:
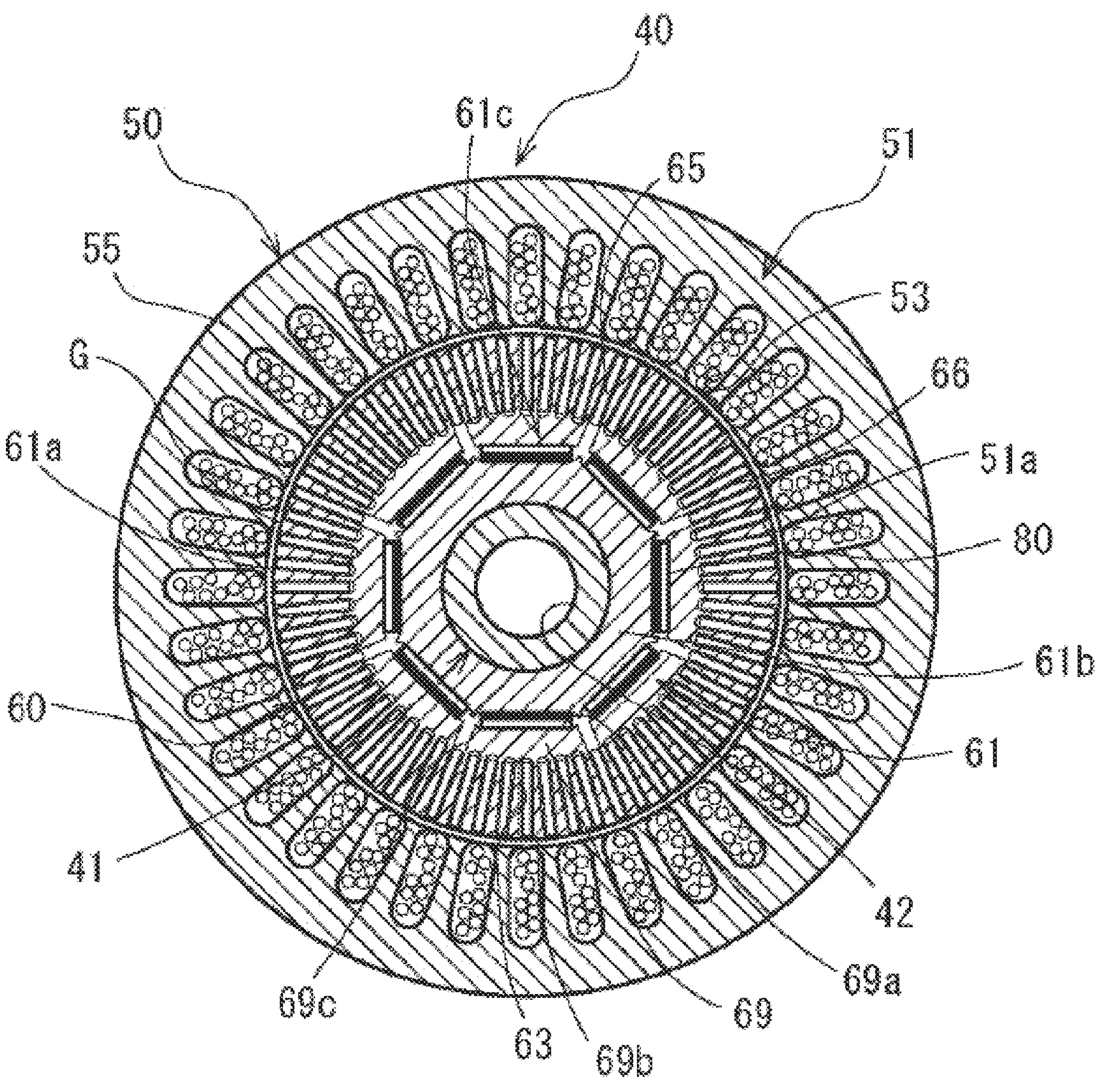
FIG. 4 is a cross-sectional view schematically illustrating a motor.

FIG. 4 is a cross-sectional view schematically illustrating the motor 40. In FIG. 4, in order to make the drawing easily viewable, a secondary conductor 65 and a resin 66 are not hatched. In addition, in FIG. 4, in order to make the drawing easily viewable, an air gap G is exaggerated in size. As illustrated in FIG. 4, the motor 40 includes a rotary shaft 41, a rotor 60, and a stator 50. The motor 40 is mounted on the electric vehicle 1 in a manner to set the rotary shaft 41 to be substantially horizontal.

The rotary shaft 41 is supported by a casing of the motor 40 to be rotatable by a bearing. The rotary shaft 41 is formed in a cylindrical shape, and an internal space thereof constitutes a channel 42 through which a refrigerant for cooling each section of the motor 40 flows. A pump is connected to one end of the channel 42, and the refrigerant is supplied by this pump.

The rotor 60 is formed in a cylindrical shape whose inner diameter is slightly larger than an outer diameter of the rotary shaft 41. The rotor 60 is arranged on a radially outer side of the rotary shaft 41 and is attached to the rotary shaft 41 in an integrally rotatable manner therewith. Meanwhile, the stator 50 is formed in a cylindrical shape, and is arranged on a radially outer side of the rotor 60 such that a center axis of the stator 50 matches a center axis of the rotary shaft 41. In other words, the rotor 60 is rotatably arranged in the stator 50 to be coaxial with the center axis of the stator 50. An inner diameter of the stator 50 and an outer diameter of the rotor 60 are set to such dimensions that, when the rotor 60 is arranged in the stator 50, an inner circumferential surface 51*a* of the stator 50 and an outer circumferential surface 61*a* of the rotor 60 oppose each other across the air gap G.

In addition, as illustrated in FIG. 2, a motor temperature sensor 43, a torque sensor 45, a rotation angle sensor 47, and the like are attached to the motor 40. The motor temperature sensor 43 detects a temperature of the motor 40, the torque sensor 45 detects motor torque, and the rotation angle sensor 47 detects a rotation angle of the rotor 60. These motor temperature sensor 43, torque sensor 45, and rotation angle sensor 47 are electrically connected to the motor ECU 13 and output, to the motor ECU 13, a signal representing the detected temperature, a signal representing a magnitude of the motor torque, and a signal representing the rotation angle of the rotor 60, respectively.

In the thus-configured motor 40, a drive current is supplied to the stator 50 from the battery 20 via the inverter 30 on the basis of a command from the motor ECU 13. Consequently, a rotating magnetic field is created in the stator 50, which in turn rotationally drives the rotor 60 and drives the front wheels 7 of the electric vehicle 1. Hereinafter, the rotor 60 and the stator 50 will be described in detail.

<Rotor>

As illustrated in FIG. 4, the rotor 60 has a rotor core 61, the plural secondary conductors 65 that are embedded in the rotor core 61, and plural (eight) permanent magnets 80 that are also embedded in the rotor core 61.

The rotor core 61 is made of a magnetic material such as iron and has an inner prism section 61*b* and an outer cylindrical section 61*c*. The inner prism section 61*b* is formed in a prism shape whose outer shape is octagonal and inner shape is circular when seen in an axial direction.

The outer cylindrical section 61*c* has eight blocks 69. Each of the blocks 69 is formed to have such a cross-sectional shape that a lower base 69*b* of an isosceles trapezoid is arcuate when seen in the axial direction. In addition, the arcuate lower base 69*b* of each of the blocks 69 is formed with eight groove strips 63, each of which extends toward an upper base 69*a*. In the outer cylindrical section 61*c*, the eight blocks 69 are combined such that the upper base 69*a* of each of the blocks 69 faces a radially inner side and that legs 69 oppose each other in a circumferential direction. In this way, when seen in the axial direction, the outer cylindrical section 61*c* has a cylindrical shape whose outer shape is circular and inner shape is octagonal. In addition, when the eight blocks 69 are combined, a space between two each of a circumferentially-opposing legs 69*c* also constitutes the groove strip 63. In this way, in an outer circumferential section of the rotor core 61, the 72 (8 blocks×8 strips+8 strips) groove strips 63 are formed at equally-spaced intervals in the circumferential direction. Each of the groove strips 63 has a rectangular cross section, extends over an entire axial length of the rotor core 61, and is recessed radially inward from the outer circumferential surface 61*a* of the rotor core 61. In other words, in the outer circumferential section of the rotor core 61, the 72 groove strips 63, each of which extends in the radial direction, are radiated when seen in the axial direction. A rotor shatter-proof cover is attached to the outer circumferential surface 61*a* of the rotor core 61, in which the eight blocks 69 are combined.

The permanent magnet 80 is formed in a plate shape that extends in the axial direction of the rotor 60 and has a rectangular cross section. Each of the eight permanent magnets 80 is embedded in the rotor core 61 in a manner to be sandwiched between an outer circumferential surface of the inner prism section 61*b* having the octagonal outer shape and the upper base 69*a* of respective one of the eight blocks 69. As illustrated in FIG. 4, these eight permanent magnets 80 are arranged such that the permanent magnet 80, whose N pole indicated in black faces radially outward and S pole indicated in blank faces radially inward, and the permanent magnet 80, whose S pole faces radially outward and N pole faces radially inward, are alternately aligned in the circumferential direction. In this way, the permanent magnets 80 form eight poles. In addition, these eight permanent magnets 80 are integrated with the rotor core 61 by the resin 66 that is supplied through the groove strips 63, each of which is formed by the circumferentially-opposing legs 69.

Each of the permanent magnets 80 is made of a ferrite magnet. A motor that uses a rare earth magnet such as neodymium as the permanent magnet has such concern that, when the permanent magnet reaches a high temperature (220°), the permanent magnet is permanently demagnetized by an antimagnetic field and loses a function as the magnet, which causes the motor to no longer function. However, in this embodiment, since the ferrite magnet is used as the permanent magnet 80, it is possible to suppress a reduction in motor output, which is caused by demagnetization of the permanent magnet 80 in a high-speed, high-load state.

Figure 5:
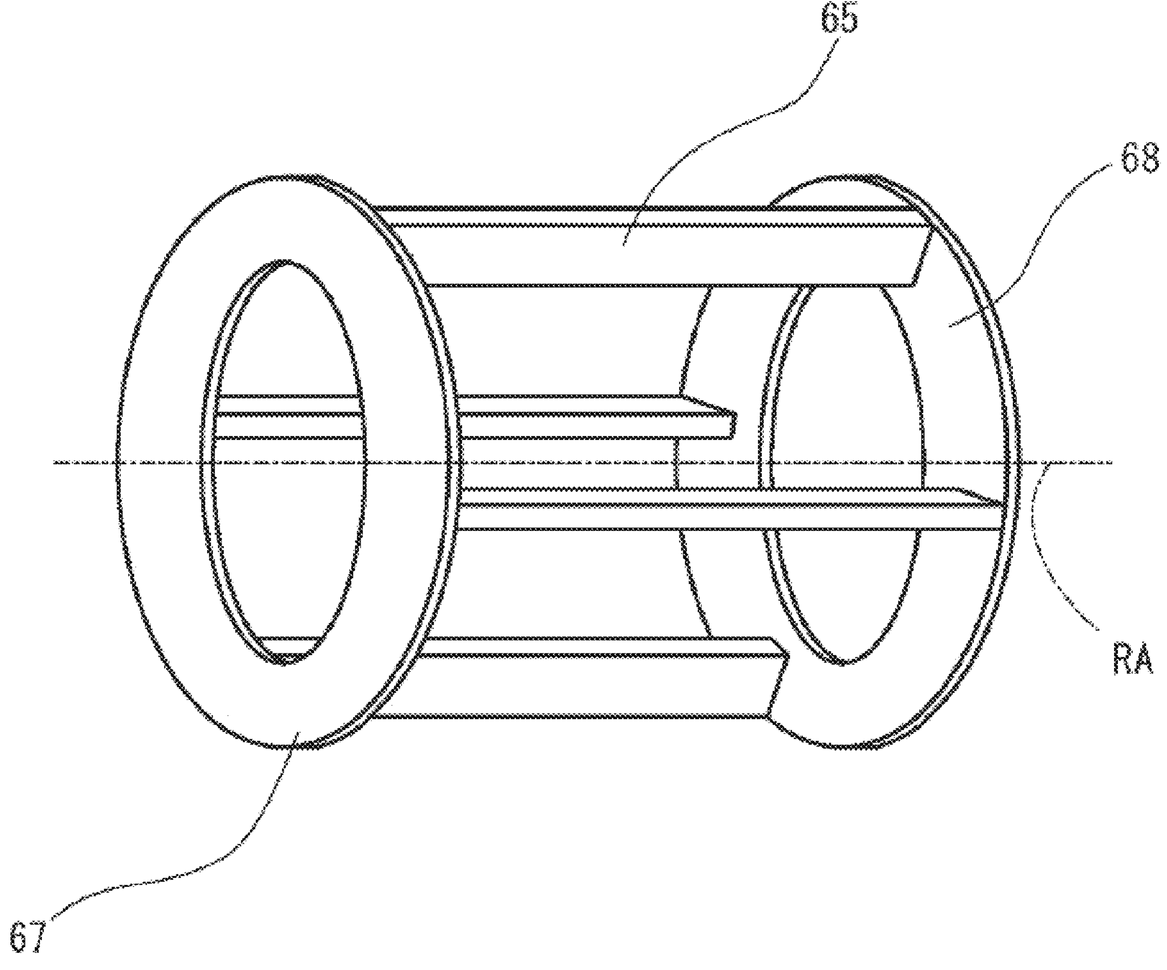
FIG. 5 is a perspective view schematically illustrating a secondary conductor.

FIG. 5 is a perspective view schematically illustrating the secondary conductor 65. In FIG. 5, in order to make the drawing easily viewable, only 4 of the 72 secondary conductors 65 are illustrated. In addition, FIG. 5 illustrates a rotation axis RA of the motor 40. Each of the secondary conductors 65 is made of a magnetic material such as copper and, as illustrated in FIG. 4 and FIG. 5, formed in a rectangular plate shape that extends over an entire axial length of the rotor 60. Each of the 72 secondary conductors 65 is inserted in respective one of the groove strips 63 that are formed in the outer circumferential section of the rotor core 61. In this way, the 72 secondary conductors 65 are aligned in the circumferential direction and radiated when seen in the axial direction. A gap between each of the groove strips 63 and each of the secondary conductors 65 inserted in the respective groove strip 63 is filled with the resin 66 that is supplied by injection molding. In this way, the rotor core 61 and the secondary conductors 65 are integrated. Here, FIG. 4 illustrates the 72 groove strips 63 and the 72 secondary conductors 65. However, these are merely illustrative, and the number of the groove strips 63 and the number of the secondary conductors 65 are not limited thereto.

As illustrated in FIG. 5, in each of the 72 secondary conductors 65, an end portion on one side (a left side in FIG. 5) in the axial direction (of the rotation axis RA) is coupled to a copper-made first end ring 67 (a shortening ring) by welding or the like, and an end portion on the other side (a right side in FIG. 5) in the axial direction is coupled to a copper-made second end ring 68 (a shortening ring) by welding or the like. In this way, the 72 secondary conductors 65 define a cage shape. The 72 secondary conductors 65 are electrically connected to each other via the first and second end rings 67, 68, just as described, and thereby form a closed circuit. When each of the secondary conductors 65 crosses the magnetic field, an induced electromotive force is generated in the respective secondary conductor 65 due to electromagnetic induction. However, since the 72 secondary conductors 65 form the closed circuit as described above, an induced current flows through each of the secondary conductors 65. Here, in order to prevent current leakage, which possibly occurs when the induced currents flow in opposite directions through the circumferentially-adjacent secondary conductors 65, as much as possible, an outer circumferential surface of each of the secondary conductors 65 is insulated.

<Stator>

As illustrated in FIG. 4, the stator 50 has a cylindrical stator core 51 and plural stator coils 55 as primary conductors.

The stator core 51 may be formed by stacking and integrally coupling plural electromagnetic steel sheets, each of which is punched into a predetermined shape, for example, or may be formed of a powder magnetic body that is formed by subjecting magnetic powder to compression molding in a mold, for example. The stator core 51 has plural grooves referred to as slots 53. Each of the slots 53 extends radially outward from the inner circumferential surface 51*a* of the stator core 51, and the adjacent slots 53 separate from each other in a circumferential direction of the stator core 51.

Plural stator coils 55 are accommodated in each of the slots 53 and each wound by so-called distributed winding. These plural stator coils 55 are U-phase coils, a V-phase coils, and W-phase coils, for example. The stator coils 55 are each accommodated in the corresponding slot 53 to constitute 18 poles.

—Inverter—

The inverter 30 is configured to convert the direct current, which is supplied from the battery 20, to the alternating current and supply the alternating current to the motor 40 while converting regenerative electric power, which is generated by the motor 40, to DC power and supplying the DC power to the battery 20. In this way, the inverter 30 is configured to be able to charge the battery 20. In addition, the inverter 30 is electrically connected to the motor ECU 13, and controls the current supplied from the battery 20 on the basis of a command from the motor ECU 13. More specifically, the inverter 30 is configured to supply the alternating current, whose phases are each shifted by 120°, to the U-phase coils, the V-phase coils, and the W-phase coils. When the alternating current is supplied from the inverter 30 to the stator coils 55, just as described, the 18 rotating magnetic fields are created in the stator 50 (the stator coils 55).

—Motor ECU—

Similar to the ECU 11 and the battery ECU 15, the motor ECU 13 is configured to include a so-called microcomputer having, for example, a CPU, ROM, RAM, backup RAM, an input/output interface, and the like. The CPU executes various types of control by executing signal processing according to a program, which is stored in the ROM in advance, while using a temporary storage function of the RAM.

As described above, the motor ECU 13 is connected to the ECU 11 via the CAN communication line, and is configured to output, to the ECU 11, a signal related to the temperature of the motor 40 received from the motor temperature sensor 43, a signal related to the motor torque received from the torque sensor 45, and a signal related to the rotation angle of the rotor 60 received from the rotation angle sensor 47. Then, the motor ECU 13 is configured to control the motor 40 via the inverter 30 such that the required torque for the motor 40, which is input from the ECU 11, is generated.

(Mode Switching Control)

In the vehicle drive system 10 according to this embodiment, as described above, the rotor 60 has not only the permanent magnet 80 but also the secondary conductor 65. Thus, the motor 40 can be rotationally driven in two different modes that are: a synchronous operation mode in which the rotor 60 is rotated by using a magnetic force of the permanent magnet 80; and the asynchronous operation mode in which the rotor 60 is rotated by using the induced current generated in the secondary conductor 65.

More specifically, the ECU 11, the motor ECU 13, and the inverter 30 control the rotating magnetic field by causing a flow of an input current of a predetermined phase, a predetermined advance angle, and a predetermined magnitude through the stator coil 55 on the basis of the rotation angle of the rotor 60 detected by the rotation angle sensor 47, and the like. In this way, the ECU 11, the motor ECU 13, and the inverter 30 are configured to execute mode switching control to switch between the synchronous operation mode and the asynchronous operation mode.

In this way, in relation to the claims, the ECU 11, the motor ECU 13, and the inverter 30 in this embodiment correspond to the "control section (e.g., circuitry) capable of switching a drive mode of the motor between the synchronous operation mode, in which the rotor is rotated by using the magnetic force of the permanent magnet, and the asynchronous operation mode, in which the rotor is rotated by using the induced current generated in the secondary conductor". Hereinafter, the ECU 11, the motor ECU 13, and the inverter 30 will also be referred to as the "ECU 11 and the like", and a description will be made on the synchronous operation mode and the asynchronous operation mode executed by the ECU 11 and the like.

—Synchronous Operation Mode—

In the synchronous operation mode, an angular velocity of the rotating magnetic field is synchronized with (made to match) a mechanical rotational speed of the rotor 60 through control of the rotating magnetic field by the ECU 11 and the like. In addition, in the synchronous operation mode, the DC power that is supplied from the battery 20 is converted to AC power during rotation of the rotor 60. Meanwhile, when the rotor 60 is stationary, a steady current is generated in each phase. In the synchronous operation mode, steady torque is generated by the rotating magnetic field and the permanent magnet 80. The induced current is generated when the secondary conductor 65 moves relative to the rotating magnetic field (crosses the magnetic field). However, in the synchronous operation mode, in which the angular velocity of the rotating magnetic field matches the mechanical rotational speed of the rotor 60, the induced current does not flow through the secondary conductor 65. That is, in the synchronous operation mode, the secondary conductor 65 does not affect output torque of the motor 40.

—Asynchronous Operation Mode—

In the asynchronous operation mode, through the control of the rotating magnetic field by the ECU 11 and the like, a speed difference is generated between the angular velocity of the rotating magnetic field and the mechanical rotational speed of the rotor 60, so as to prevent matching (cause mismatching) therebetween. In addition, in the asynchronous operation mode, the DC power that is supplied from the battery 20 is converted to the AC power when the rotor 60 is either rotated or stationary. In the asynchronous operation mode, the steady torque is generated by the rotating magnetic field and the induced current generated in the secondary conductor 65. In the asynchronous operation mode, the angular velocity of the rotating magnetic field is always excessively higher or lower than the mechanical rotational speed of the rotor 60, and thus the permanent magnet 80 causes positive/negative torque fluctuations. Then, due to an effect of the torque fluctuation, the steady torque, which is generated by the rotating magnetic field and the secondary conductor 65, fluctuates. That is, in the asynchronous operation mode, the permanent magnet 80 affects the output torque of the motor 40.

—How to Use Both Modes—

In the synchronous operation mode, similar to the normal PM motor, it is concerned that a large back electromotive force is generated due to an effect of the permanent magnet 80 in a high-speed, high load range, resulting in the reduced output.

Meanwhile, the drive power is changed constantly due to the driving operation by the driver or the travel environment. Accordingly, when the required output for the motor 40 is changed, it is desired to switch the operation state of the motor 40, which is the drive source of the electric vehicle 1, in order for the motor 40 to generate the required output.

Thus, in the vehicle drive system 10 according to this embodiment, the ECU 11 is configured to switch a drive mode of the motor 40 from the synchronous operation mode to the asynchronous operation mode on the basis of the required output for the motor 40.

More specifically, the ECU 11 estimates the required output (torque) for the motor 40 on the basis of the vehicle speed V detected by the vehicle speed sensor 74, the accelerator pedal depression amount detected by the accelerator pedal sensor 70, the location information received from the GPS receiver 75, the map database stored in the ROM, and the like. Then, in the case where the required torque is higher than allowable limit torque in the synchronous operation mode, the ECU 11 switches the drive mode of the motor 40 from the synchronous operation mode to the asynchronous operation mode.

As described above, since the ECU 11 switches the drive mode of the motor 40 from the synchronous operation mode to the asynchronous operation mode according to the required output for the motor 40, the characteristic of the motor 40 can be changed during travel of the electric vehicle 1 by such mode switching. In this way, it is possible to generate a wide range of the required output according to the driver's preference.

By the way, the motor 40 includes both of the secondary conductor 65, in which the induced current is generated, and the permanent magnet 80. When the motor 40 functions as an asynchronous motor, as described above, torque pulsation occurs due to the magnetic force of the inevitably existing permanent magnet 80. Thus, it is assumed that such torque pulsation is transmitted to a cabin and gives a sense of discomfort to the driver.

To handle such a problem, in the vehicle drive system 10 according to this embodiment, the ECU 11 and the like are configured that, in the asynchronous operation mode, a current that generates torque in an opposite phase from a phase of the torque pulsation by the permanent magnets 80 is superimposed on the drive current generated by the motor 40, and then such a current is supplied to the stator coil 55 of the stator 50.

Figure 6:
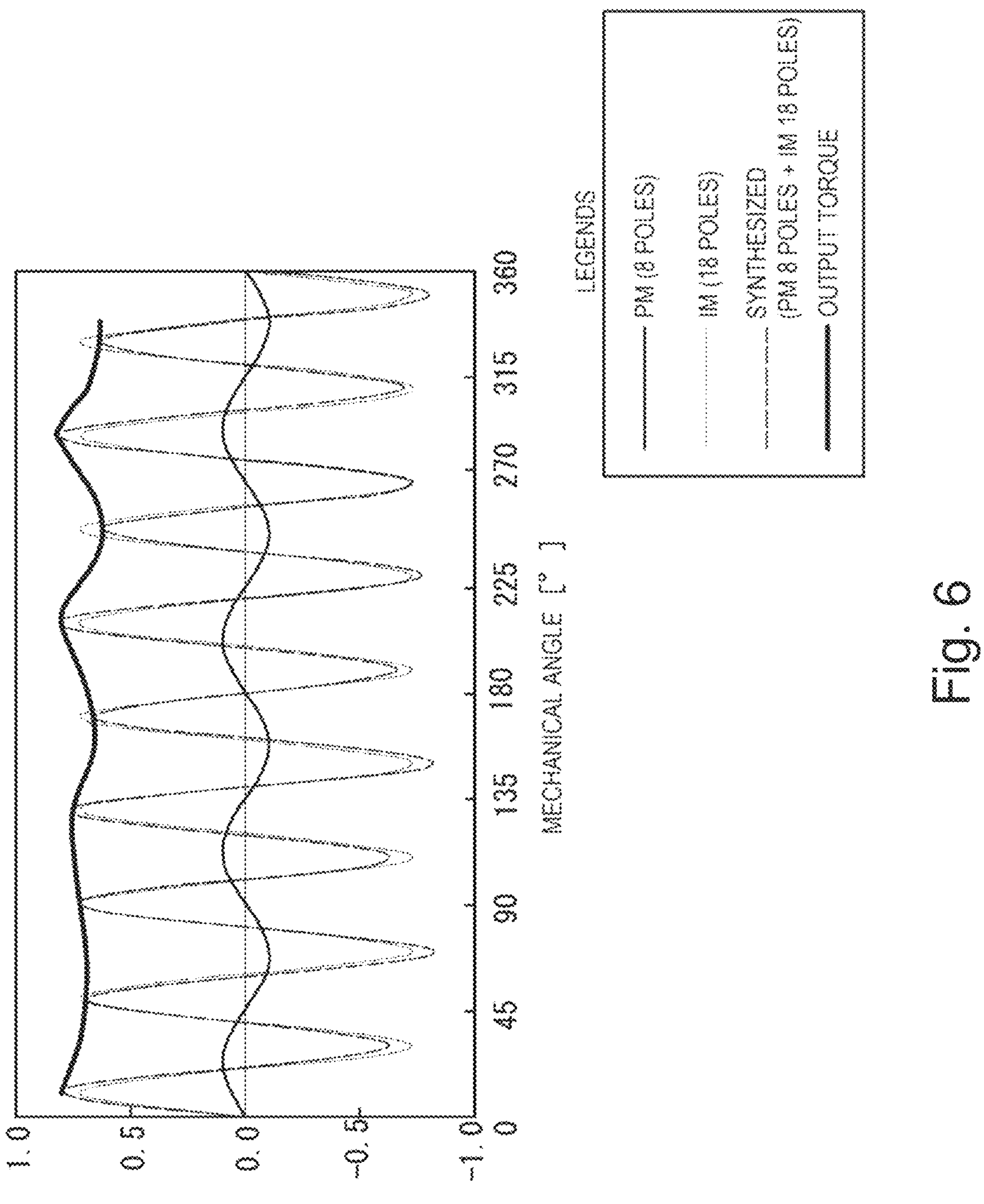
FIG. 6 is a graph schematically illustrating motor output torque in an asynchronous operation mode.
Figure 7:
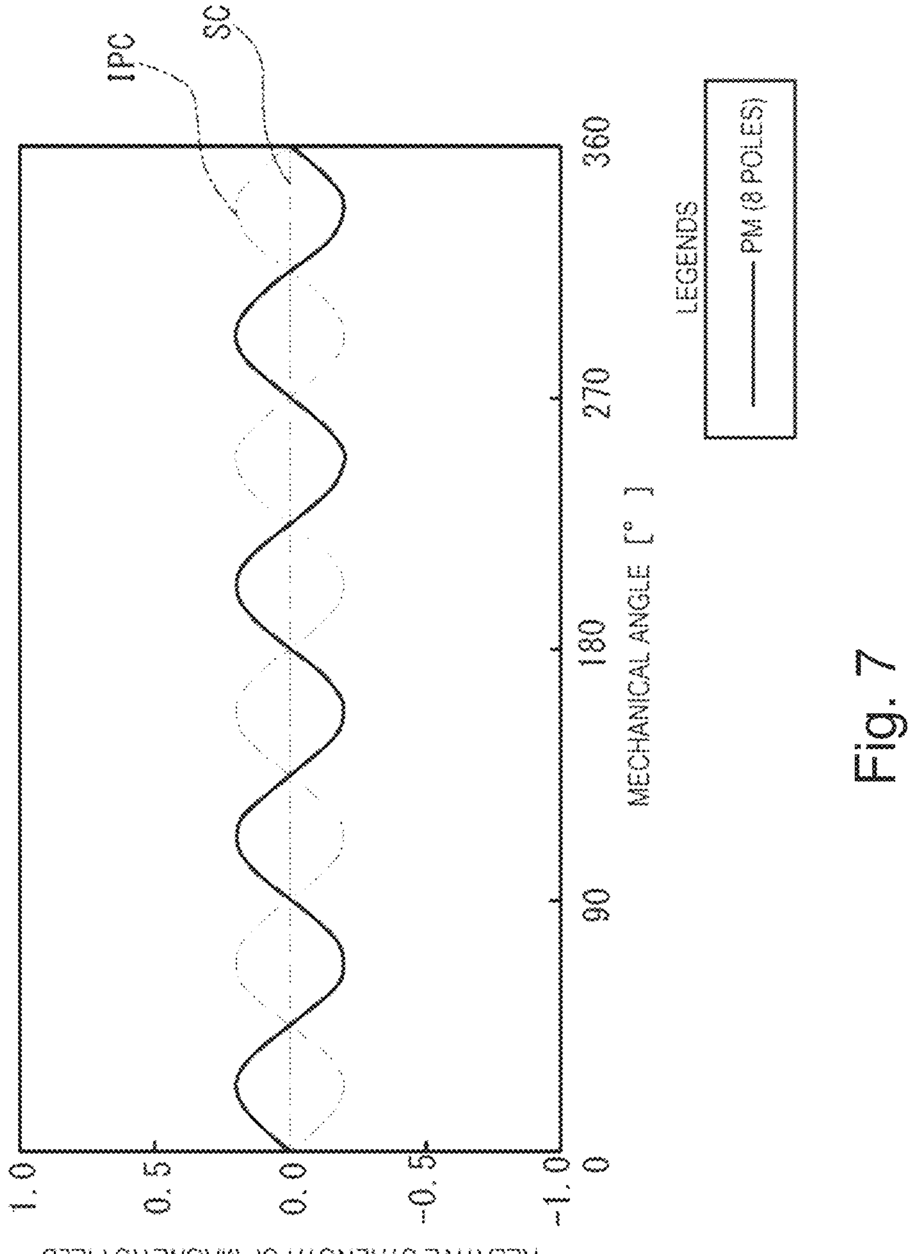
FIG. 7 is a graph schematically illustrating a state where an antiphase component is applied to a magnetic field created by a permanent magnet.
Figure 8:
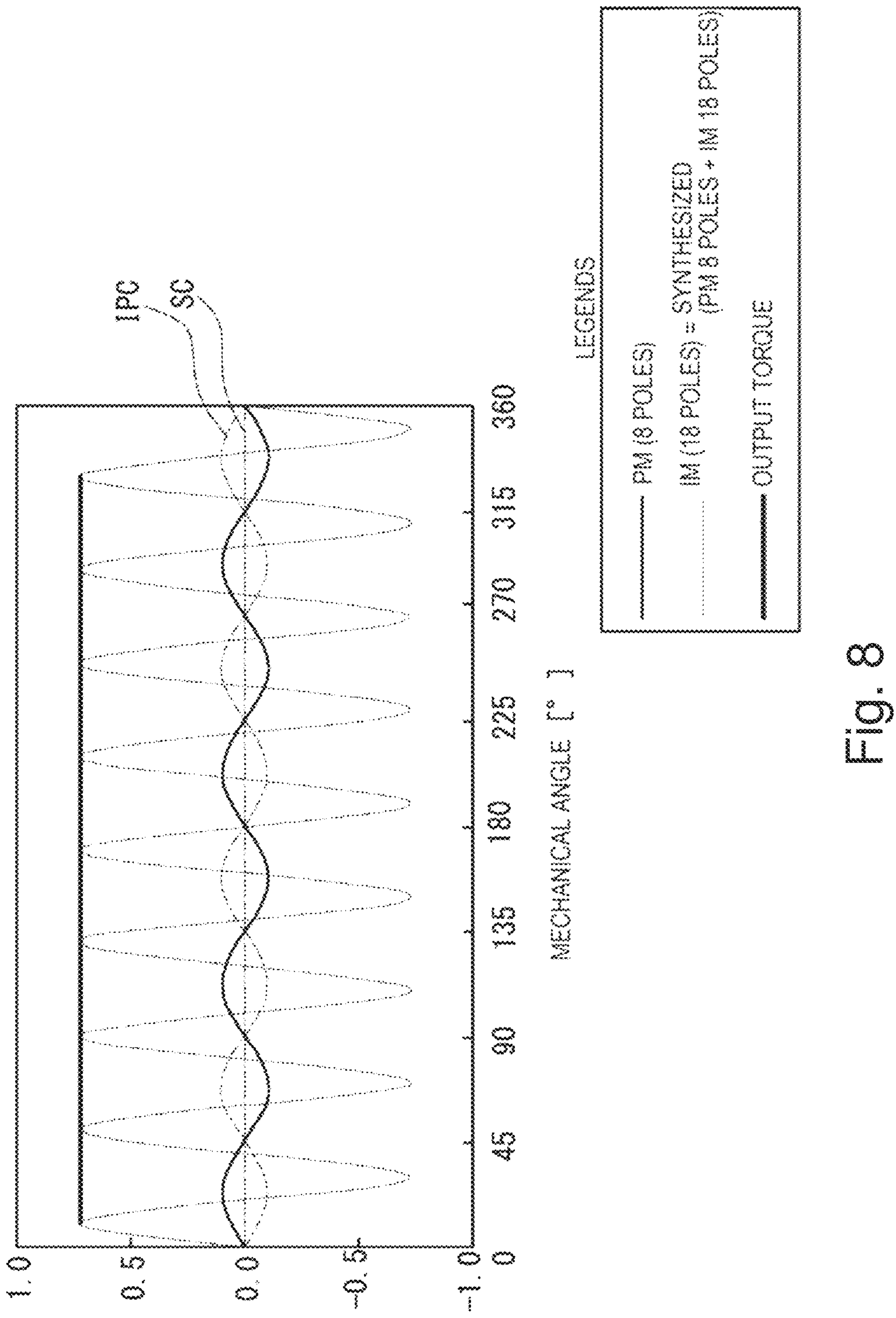
FIG. 8 is a graph schematically illustrating the motor output torque when the antiphase component is applied to the magnetic field created by the permanent magnet in an asynchronous operation mode.

FIG. 6 is a graph schematically illustrating the output torque of the motor 40 in the asynchronous operation mode. FIG. 7 is a graph schematically illustrating a state where an antiphase component is applied to the magnetic field created by the permanent magnet 80. FIG. 8 is a graph schematically illustrating the output torque of the motor 40 when the antiphase component is applied to the magnetic field created by the permanent magnet 80 in the asynchronous operation mode.

In the asynchronous operation mode, a period of the magnetic field created by an 18-pole IM motor (asynchronous motor) differs from a period of the magnetic field created by the PM motor (the synchronous motor) using the 8-pole permanent magnets 80. In other words, there is a period difference between these magnetic fields. Thus, as it is understood from a comparison between a dotted line (IM) and a thin solid line (PM) in FIG. 6, a phase difference is generated therebetween. Thus, the output torque, which is generated by the magnetic field combining those two magnetic fields (see a broken line in FIG. 6), is not the steady torque and fluctuates (pulsates) as indicated by a bold solid line in FIG. 6.

Meanwhile, as illustrated in FIG. 7, when an antiphase component IPC (a one-dot chain line in FIG. 7) is applied to the magnetic field (a thin sold line in FIG. 7) created by the eight-pole permanent magnets 80, the magnetic field created by the eight-pole permanent magnets 8 is canceled out in the control due to a principle of superimposition, and relative strength of a magnetic field created by a synthetic component SC (a two-dot chain line in FIG. 7) of a phase component of the magnetic field created by the eight-pole permanent magnets 80 and the antiphase component IPC becomes 0 (zero).

Accordingly, in the asynchronous operation mode, when the antiphase component is applied to the magnetic field created by the permanent magnets 80, only the magnetic field by the 18-pole IM motor is generated, despite presence of the permanent magnets 80. As a result, the output torque that is generated by the synthetic magnetic field is the steady torque as indicated by a bold solid line in FIG. 8.

Thus, when the ECU 11 and the like superimpose the current, which generates the torque in the opposite phase from the phase of the torque pulsation by the permanent magnet 80, on the drive current of the motor 40, the torque pulsation by the permanent magnets 80 in the asynchronous operation mode can be canceled out. Therefore, it is possible to suppress unpleasant vibration of the motor 40 from being transmitted to the cabin.

Meanwhile, in the engine vehicle, engine vibration that is transmitted to the cabin is changed according to a difference in an engine operation state. Thus, many drivers recognize the engine operation state from such vibration transmitted to the cabin. On the contrary, in the vehicle that is driven by the motor 40, it is difficult for the driver to recognize the vibration of the motor 40 in comparison with the vibration of the engine. Thus, such a case is assumed that, when the driver who is accustomed to driving the engine vehicle drives the motor-driven vehicle, the driver cannot recognize the operation state from the vibration transmitted to the cabin and thus feels the sense of discomfort.

In order to handle the above case, in the vehicle drive system 10 according to this embodiment, the ECU 11 and the like are configured to allow the torque pulsation in a travel state that requires the relatively high drive torque in the asynchronous operation mode.

The "travel state that requires the relatively high drive torque" means a case where the required torque for the motor 40 becomes higher than a predetermined value that is set in advance in a manner to correspond to a situation where the engine operation state is changed rapidly. Examples of such a situation include the time when the engine vehicle is accelerated rapidly and the time when the engine vehicle is started on the uphill road.

In the case where the ECU 11 and the like are configured as described above, for example, the torque pulsation can be canceled out during normal time. In addition, in the travel state that requires the relatively high drive torque, such as the time when the acceleration is requested, in other words, in the case where the required torque for the motor 40 is higher than the predetermined value, the torque pulsation is allowed. Thus, the vibration of the motor 40, which is transmitted to the cabin, allows the driver to recognize that the vehicle is accelerated as desired by the driver himself/herself, for example.

Here, whether the driver prefers to cancel out the torque pulsation or allow the torque pulsation is input to the ECU 11 when the driver operates the selection switch 76 that is provided on an instrument panel, for example. Consequently, for example, when the driver operates the selection switch 76 to be ON, the antiphase component is applied to the magnetic field created by the permanent magnets 80, and the torque pulsation is thus canceled out. Meanwhile, when the driver operates the selection switch 76 to be OFF, the torque pulsation is allowed in the travel state that requires the relatively high drive torque.

(Control Flow)

Next, a description will be made on an example of control, which is executed by the ECU 11 and the like, with reference to a flowchart illustrated in FIG. 9.

First, in step S1, the ECU 11 reads the ON/OFF operation of the selection switch 76 by the driver. Then, the processing proceeds to step S2.

In next step S2, the ECU 11 acquires the required torque for the motor 40 on the basis of the vehicle speed V, the accelerator pedal depression amount, the travel environment of the electric vehicle 1, and the like. Then, the processing proceeds to step S3.

In next step S3, the ECU 11 and the like acquire a temperature (an actual operating temperature) of the permanent magnet 80 detected by the motor temperature sensor 43. Then, the processing proceeds to step S4.

In next step S4, the ECU 11 determines whether the required torque for the motor 40, which is acquired in step S2, is lower than the allowable limit torque in the synchronous operation mode. If it is determined YES in this step S4, the processing proceeds to step S5. On the other hand, if it is determined NO in this step S4, the processing proceeds to step S7. In next step S5, the ECU 11 determines whether the actual operating temperature of the permanent magnet 80, which is acquired in step S3, is lower than an allowable temperature of the permanent magnet 80. If it is determined YES in this step S5, the processing proceeds to step S6. On the other hand, if it is determined NO in this step S5, the processing proceeds to step S7. That is, only in the case where the required torque is lower than the allowable limit torque in the synchronous operation mode and the actual operating temperature is lower than the allowable temperature, the processing proceeds to step S6. Then, the ECU 11 and the like set the operation mode of the motor 40 to the synchronous operation mode, and thereafter the processing returns. Otherwise, the processing proceeds to step S7.

In next step S7, the ECU 11 and the like set the operation mode of the motor 40 to the asynchronous operation mode, and then the processing proceeds to step S8.

In next step S8, the ECU 11 determines whether the operation of the selection switch 76, which is read in step S1, is the ON operation. If it is determined YES in this step S8, the processing proceeds to step S9, and the ECU 11 and the like superimpose the current, which generates the torque in the opposite phase from the phase of the torque pulsation by the permanent magnet 80, on the drive current of the motor 40. Then, the processing returns.

On the other hand, if it is determined NO in step S8, that is, if the operation of the selection switch 76 is the OFF operation, the processing proceeds to step S10. Then, similar to step S9, the ECU 11 and the like superimpose the current, which generates the torque in the opposite phase from the phase of the torque pulsation by the permanent magnet 80, on the drive current of the motor 40. Thereafter, the processing proceeds to step S11.

In next step S11, the ECU 11 determines whether the required torque for the motor 40, which is acquired in step S2, exceeds a predetermined value that is set in advance. If it is determined NO in this step S11, the processing returns while the torque in the opposite phase from the phase of the torque pulsation by the permanent magnet 80 remains to be generated. On the other hand, it is determined YES in this step S11, the processing proceeds to step S12, and the ECU 11 and the like stop supplying the current, which generates the torque in the opposite phase from the phase of the torque pulsation by the permanent magnet 80. Then, the processing returns.

Figure 9:
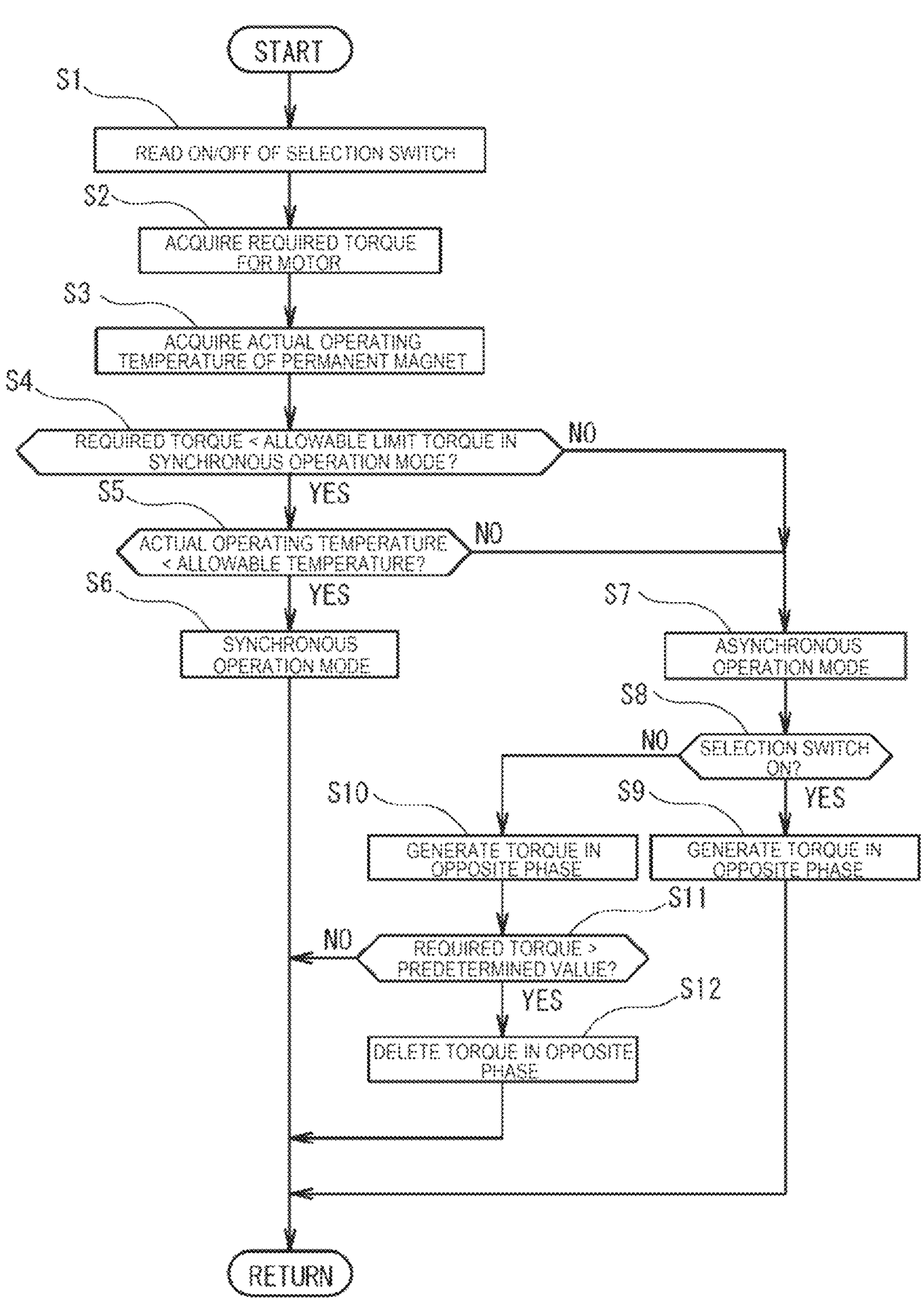
FIG. 9 is a flowchart illustrating an example of control that is executed by a control section.

In the example illustrated in FIG. 9, in the case where the operation of the selection switch 76 is the OFF operation, basically, the torque pulsation is canceled out in the asynchronous operation mode. Then, when the required torque for the motor 40 exceeds the predetermined value, the torque pulsation is allowed. However, the allowable limit torque may be set to satisfy the predetermined value≈the allowable limit torque in the synchronous operation mode, for example. Then, as in a flowchart illustrated in FIG. 10, in the case where the operation of the selection switch 76 is the OFF operation, the torque pulsation may be allowed thoroughly.

Figure 10:
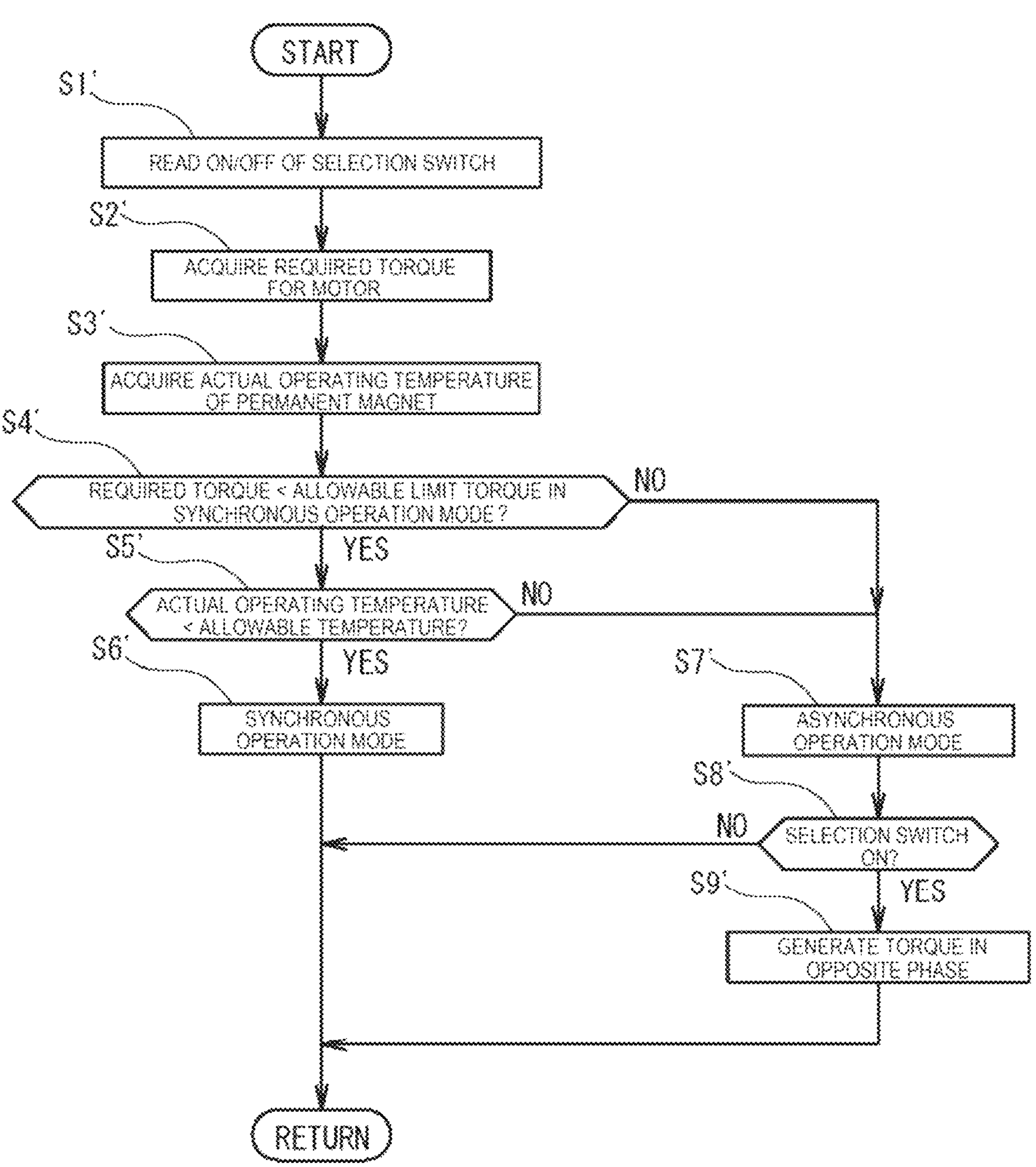
FIG. 10 is a flowchart illustrating another example of the control that is executed by the control section.

More specifically, in the flowchart of FIG. 10, if it is determined NO in step S8', that is, if the operation of the selection switch 76 is the OFF operation, the processing may return as it is (without canceling out the torque pulsation). Here, steps S1' to S7' and S9' in FIG. 10 are the same procedure as steps S1 to S7 and S9 in FIG. 9. Thus, the description thereon will not be made.

(Other Embodiments)

The disclosure is not limited to the embodiment and can be carried out in various modes without departing from the spirit and main features thereof.

In the above embodiment, in the case where the driver performs the OFF operation of the selection switch 76, the torque pulsation is allowed in such a travel state where the relatively high drive torque is required. However, the disclosure is not limited thereto. For example, in the travel state where the relatively high drive torque is required, the torque pulsation may be amplified. In this case, the torque pulsation can easily be amplified, for example, by applying an in-phase component to the magnetic field created by the permanent magnets 80.

In the above embodiment, the condition to allow the torque pulsation is set as the "travel state that requires the relatively high drive torque". However, the condition is not limited thereto. The condition to allow the torque pulsation may be set as a "travel state that requires relatively high regenerative torque", and an example of such a travel state is the time during rapid deceleration.

In the above embodiment, the torque pulsation is allowed in the case where the required torque for the motor 40 is higher than the predetermined value. However, the disclosure is not limited thereto. For example, the torque pulsation may be allowed in the case where an absolute value of a change amount (including positive and negative amounts) or a change speed (including positive and negative speeds) of the drive torque exceeds a predetermined change amount or a predetermined change speed, which is defined in advance.

In the above embodiment, the eight permanent magnets 80 are embedded in the rotor core 61. However, the disclosure is not limited thereto. The 6 or less or 10 or more permanent magnets 80 may be embedded in the rotor core 61.

In the above embodiment, the motor 40 is arranged in a front portion of the electric vehicle 1 in the vehicle front-rear direction, and the front wheels 7 are the drive wheels. However, the disclosure is not limited thereto. For example, the motor 40 may be arranged in a rear portion of the electric vehicle 1 in the vehicle front-rear direction, and the rear wheels 8 may be the drive wheels.

As described above, the above-described embodiment is merely illustrative in all respect and thus should not be construed in a restrictive manner. Furthermore, modifications and changes that fall within equivalents of the claims fall within the scope of the disclosure.

INDUSTRIAL APPLICABILITY

According to the disclosure, the characteristic of the motor can be changed according to the wide range of the required output. Thus, the disclosure is extremely beneficial when being applied to the vehicle drive system that includes the motor as the traveling drive source.

DESCRIPTION OF REFERENCE SIGNS AND NUMERALS

1: VEHICLE
7: FRONT WHEEL (DRIVE WHEEL)
10: VEHICLE DRIVE SYSTEM
11: ECU (CONTROL SECTION)
13: MOTOR ECU (CONTROL SECTION)
30: INVERTER (CONTROL SECTION)
40: MOTOR
50: STATOR
55: STATOR COIL
60: ROTOR
61*c*: OUTER CYLINDRICAL SECTION (RADIALLY OUTER PORTION)
65: SECONDARY CONDUCTOR
80: PERMANENT MAGNET

The invention claimed is:

1. A vehicle drive system comprising:

a motor that has a cylindrical stator and a cylindrical rotor rotatably provided in the stator to be coaxial with a center axis of the stator and that drives a drive wheel of a vehicle by rotation of the rotor, the rotor having: secondary conductors that extend in an axial direction and aligned in a circumferential direction in a radially outer portion; and permanent magnets that extend in the axial direction and aligned in the circumferential direction in a portion on a radially inner side of the secondary conductors, circuitry configured to switch a drive mode of the motor between a synchronous operation mode and an asynchronous operation mode, wherein the circuitry is configured to determine whether a required torque for the motor is greater than an allowable limit torque in the synchronous operation mode, and determine whether an actual operating temperature of a permanent magnet of the rotor is lower than an allowable lower limit temperature, and wherein the circuitry is configured to intentionally select the asynchronous operation mode when the required torque is greater than the allowable limit torque or when the actual operating temperature is lower than the allowable lower limit temperature, so as to allow a torque pulsation of the motor.

2. The vehicle drive system according to claim 1, wherein in the asynchronous operation mode, the circuitry is configured to superimpose a current, which generates torque in an opposite phase from a phase of torque pulsation by the permanent magnet, on a drive current generated by the motor and supply the current to a stator coil of the stator.

3. The vehicle drive system according to claim 1, wherein the circuitry is configured to allow torque pulsation in a travel state that requires relatively high drive torque in the asynchronous operation mode.

4. The vehicle drive system according to claim 2, wherein the circuitry is configured to allow torque pulsation in a travel state that requires relatively high drive torque in the asynchronous operation mode.

5. The vehicle drive system according to claim 1, wherein in the asynchronous operation mode, the circuitry is configured to superimpose a current.

6. The vehicle drive system according to claim 1, wherein in the asynchronous operation mode, the circuitry is configured to superimpose a current, which generates torque in an opposite phase from a phase of torque pulsation by the permanent magnet, on a drive current generated by the motor.

* * * * *